United States Patent
Henry

(10) Patent No.: US 6,878,881 B1
(45) Date of Patent: Apr. 12, 2005

(54) MODULAR CABLE PROTECTOR ASSEMBLY

(76) Inventor: Stephen K. Henry, 3825 Northbrook Dr., #F, Boulder, CO (US) 80302

(*) Notice: Subject to any disclaimer, the term of this patent is extended or adjusted under 35 U.S.C. 154(b) by 0 days.

(21) Appl. No.: 10/935,853

(22) Filed: Sep. 8, 2004

(51) Int. Cl.$^7$ .............................. H02G 3/30; E01B 7/28
(52) U.S. Cl. ................... 174/101; 174/72 C; 174/97; 14/69.5; 104/275; 138/105; 138/110
(58) Field of Search ................. 174/50, 70 C, 174/70 R, 72 C, 97, 101; 104/275; 138/103, 105, 106, 110; 404/3; D13/155; 14/69.5

(56) References Cited

U.S. PATENT DOCUMENTS

| | | | |
|---|---|---|---|
| 585,540 A | | 6/1897 | Spangler |
| 1,914,830 A | | 6/1933 | Kostohris |
| 1,956,125 A | | 4/1934 | Leister |
| 2,391,409 A | * | 12/1945 | Geist et al. ............... 174/72 C |
| 3,357,370 A | * | 12/1967 | Walkey ...................... 104/275 |
| 3,965,967 A | | 6/1976 | Jentzsch et al. |
| 4,067,258 A | | 1/1978 | Valeri |
| 4,101,100 A | | 7/1978 | Smith et al. |
| 4,404,425 A | * | 9/1983 | Rich ........................... 174/97 |
| 4,677,799 A | | 7/1987 | Zarembo |
| 4,801,764 A | * | 1/1989 | Ohlhaber .................. 174/70 C |
| 5,095,822 A | | 3/1992 | Martin |
| 5,267,367 A | | 12/1993 | Wegmann, Jr. |
| D370,717 S | | 6/1996 | Ziaylek et al. |
| 5,566,622 A | | 10/1996 | Ziaylek et al. |
| 5,777,266 A | | 7/1998 | Herman et al. |
| 5,780,773 A | * | 7/1998 | Wakamatsu ............... 174/72 C |
| D412,490 S | | 8/1999 | Henry |
| D415,112 S | | 10/1999 | Henry |
| D415,471 S | | 10/1999 | Henry |
| D418,818 S | | 1/2000 | Henry |
| 6,067,681 A | | 5/2000 | Zeinstra et al. |
| D429,695 S | | 8/2000 | Henry |
| D436,578 S | | 1/2001 | Henry |
| D437,832 S | | 2/2001 | Henry |
| 6,202,565 B1 | | 3/2001 | Henry |
| 6,481,036 B1 | | 11/2002 | Duvall |
| 6,498,297 B2 | * | 12/2002 | Samhammer ............... 174/101 |
| 6,499,410 B1 | * | 12/2002 | Berardi ....................... 104/275 |
| 6,654,977 B1 | | 12/2003 | Chin |
| 6,747,212 B1 | | 6/2004 | Henry |
| 6,797,885 B2 | * | 9/2004 | Magyar et al. ............... 174/97 |

* cited by examiner

Primary Examiner—Dean A. Reichard
Assistant Examiner—Adolfo Nino
(74) Attorney, Agent, or Firm—Dorr, Carson, Sloan, Birney & Kramer, P.C.

(57) ABSTRACT

A modular cable protector assembly has side ramps, tunnel members, and tunnel connectors that can be removably engaged to one another in a modular fashion to form a wide variety of configurations. Each tunnel member includes a tunnel extending along its length for passage of cables, and two sets of laterally-opposed connectors that removably engage corresponding connectors on the undersides of the side ramps. Each tunnel connector has two sets of connectors that removably engage the connectors on two tunnel members and thereby secure the tunnel members in a side-by-side relationship. The side ramps and the top surface of the tunnel connector combine to provide a relatively continuous surface over the cable protector assembly that is suitable for foot traffic or wheeled traffic.

20 Claims, 6 Drawing Sheets

MODULAR CABLE PROTECTOR ASSEMBLY

BACKGROUND OF THE INVENTION

1. Field of the Invention

The present invention relates generally to the field of cable protectors. More specifically, the present invention discloses a modular cable protector assembly that enables any desired number of tunnels with channels for cables and hoses to be connected in parallel.

2. Statement of the Problem

Hose and cable bridging protective devices have been used in the past to prevent damage to hoses, cables, wiring and the like by vehicles and pedestrians. These cable protectors also help to minimize the risk of pedestrians tripping over cables. For the purposes of this application, the term "cable" should be broadly interpreted to include cables, hoses, electrical wiring, conduits, optical fibers, pneumatic tubing, plumbing, and the like.

Conventional cable protectors include one or more channels extending in parallel between the ends of the cable protector to receive the cables. Side ramps or beveled edges extend laterally outward from both sides of the cable protector to allow vehicles to roll over the top of the cable protector. Each cable protector sometimes includes a set of end connectors that enable a series of cable protectors to be attached together in a modular end-to-end fashion to any desired length.

For example, Checkers Industrial Safety Products, Inc. of Louisville, Colo., markets a modular cable protector system that enables a single tunnel to be formed from a series of tunnel members. Side ramps can be attached in a modular fashion to the tunnel members.

A problem arises if the number of channels for cables is not known in advance, or if additional channels must be added after a set of cable protectors have been installed. With conventional cable protectors, the only available options may be to install a second set of cable protectors, or else remove the existing set of cable protectors and replace them with another set having the desired number of channels. In addition, conventional cable protectors are available with only a relatively small number of channels (e.g., 1 to 5). A job requiring a greater number of channels will therefore require multiple sets of cable protectors in parallel. This creates an uneven traveling surface with multiple inclines and declines for vehicles or pedestrians crossing the cable protectors.

Therefore, a need exists for a modular cable protector assembly that can provide any desired number of channels in parallel, while creating a structure with a relatively uniform top surface. In addition, it is desirable to be able to hold the channels in fixed lateral positions relative to one another so as to minimize movement and stress on the cables.

The prior art in the field of modular cable protectors includes the following:

| Inventor | Patent No. | Issue Date |
|---|---|---|
| Spangler | 585,540 | Jun. 29, 1897 |
| Kostohris | 1,914,830 | Jun. 20, 1933 |
| Leister | 1,956,125 | Apr. 24, 1934 |
| Jentzsch et al. | 3,965,967 | Jun. 29, 1976 |
| Valeri | 4,067,258 | Jan. 10, 1978 |
| Smith et al. | 4,101,100 | Jul. 18, 1978 |
| Zarembo | 4,677,799 | Jul. 7, 1987 |
| Martin | 5,095,822 | Mar. 17, 1992 |
| Wegmann, Jr. | 5,267,367 | Dec. 7, 1993 |
| Ziaylek et al. | Des. 370,717 | Jun. 11, 1996 |
| Ziaylek et al. | 5,566,622 | Oct. 22, 1996 |
| Herman et al. | 5,777,266 | Jul. 7, 1998 |
| Henry | Des. 412,490 | Aug. 3, 1999 |
| Henry | Des. 415,112 | Oct. 12, 1999 |
| Henry | Des. 415,471 | Oct. 19, 1999 |
| Henry | Des. 418,818 | Jan. 11, 2000 |
| Zeinstra et al. | 6,067,681 | May 30, 2000 |
| Henry | Des. 429,695 | Aug. 22, 2000 |
| Henry | Des. 436,578 | Jan. 23, 2001 |
| Henry | Des. 437,832 | Feb. 20, 2001 |
| Henry | 6,202,565 | Mar. 20, 2001 |
| Duvall | 6,481,036 | Nov. 19, 2002 |
| Chin | 6,654,977 | Dec. 2, 2003 |
| Henry | 6,747,212 | Jun. 8, 2004 |

The Henry '212 patent discloses an adapter assembly for removably connecting cable protectors with side ramps in parallel.

The Henry '565 patent discloses modular cable bridging device having modular central members and ramps that can be readily connected together in side-by-side or end-to-end relationships by means of connectors.

Duvall discloses a modular cable protector having removable wheel chair ramps.

The Henry design patents show a variety of modular cable protectors and connectors for modular cable protectors.

Herman et al. disclose a cable protection system consisting of modular components that can be detachably interlocked in desired combinations by means of male and female connectors on each modular component. These modular components include cable protector modules, ramps, and curb pieces.

Kostohris discloses a flexible device that protects fire hoses by providing opposing ramps forming a passage over the hose. Kostohris teaches that additional units may be placed end-to-end and secured together using loosely fitting dovetail lugs and recesses molded into the device.

Jentzsch et al. teach a portable crossover for high tonnage earth moving vehicles having a U-shaped channel and a strip for covering the channel, and further includes a rigid plate or cable for connecting a tow vehicle to relocate the crossover.

Valeri teaches a crossover unit with a wedge-shaped rubber insert or plug that resists deflection and closes the hose-receiving slot.

Smith et al. teach an aircraft flight line servicing system in which the distribution lines run under a multi-sectional unit of extruded aluminum sections that lock together.

Zarembo discloses a multi-sectional raceway for use in combination with a pair of interconnected detection system panels. The sections are flexibly interconnected by pressure-engageable members and at least one E-shaped girder structure underneath the entire width of the platform section provides passageways for electrical wiring.

Martin teaches a cable crossover device for protecting electrical cables having a hinged lid secured by Velcro that covers the conduit and assumes part of the load. Modular sections can be coupled together by a strengthened interlocking system allowing for a variable length device.

Wegmann, Jr. discloses an interlocking, elongate ramp with a covered conduit channel. Adjacent ramp units are interlocked with members that project outwardly and upwardly from the end of each ramp unit to form a chain of ramp units.

Zeinstra et al. disclose another example of a hose bridge.

The patents to Ziaylek et al. disclose a collapsible hose bridge having a central support member that covers the hose, and two detachable ramps. Each ramp is attached by means of a curved lip that engages an arcuate slot running the length of the central support member. Ziaylek et al. also show an alternative embodiment that permits several central support members to be connected side by side.

Chin discloses a safety ramp having two sloped side faces and a top plain face forming a bridge.

Leister discloses bridge for protecting fire hoses having a plurality of tunnels.

Solution to the Problem. Nothing in the prior art shows a modular cable protector assembly that can be readily reconfigured to provide any desired number of channels in parallel, while creating a structure with a relatively continuous upper surface suitable for foot traffic or wheeled traffic. In addition, the present invention holds the channels in fixed lateral positions relative to one another so as to minimize movement and stress on the cables. Optionally, the cable protector assembly can be extended in a modular end-to-end manner to extend the length of the tunnels.

SUMMARY OF THE INVENTION

This invention provides a modular cable protector assembly having side ramps, tunnel members, and tunnel connectors that can be removably engaged to one another in a modular fashion to form a wide variety of configurations. Each tunnel member includes a tunnel extending along its length for passage of cables, and two sets of laterally-opposed connectors that removably engage corresponding connectors on the undersides of the side ramps. Each tunnel connector has two sets of connectors that removably engage the connectors on two tunnel members and thereby secure the tunnel members in a side-by-side relationship. The side ramps and the top surface of the tunnel connector combine to provide a relatively continuous surface over the cable protector assembly that is suitable for foot traffic or wheeled traffic.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
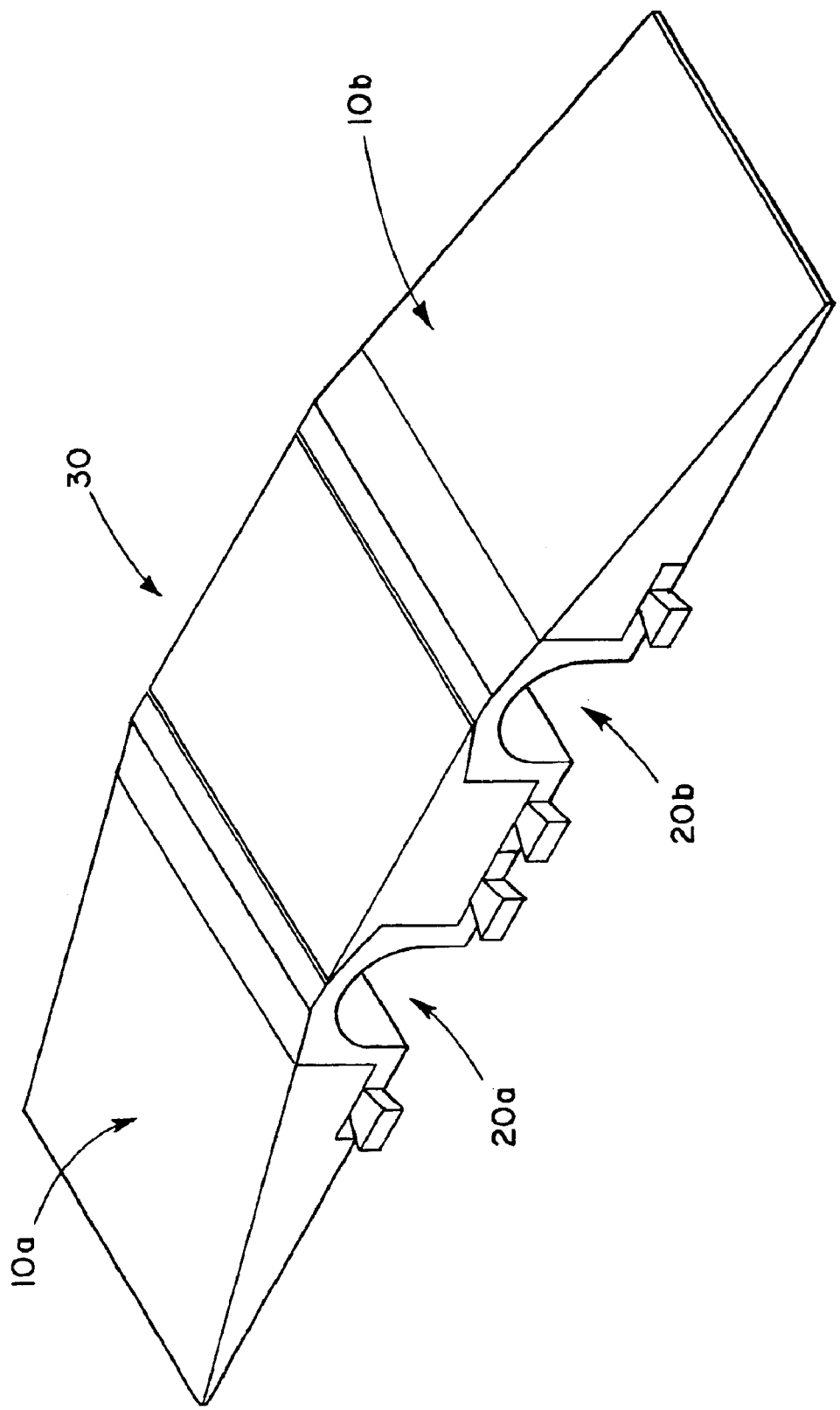
FIG. 1 is a top perspective view of the modular cable protector assembly.
Figure 2:
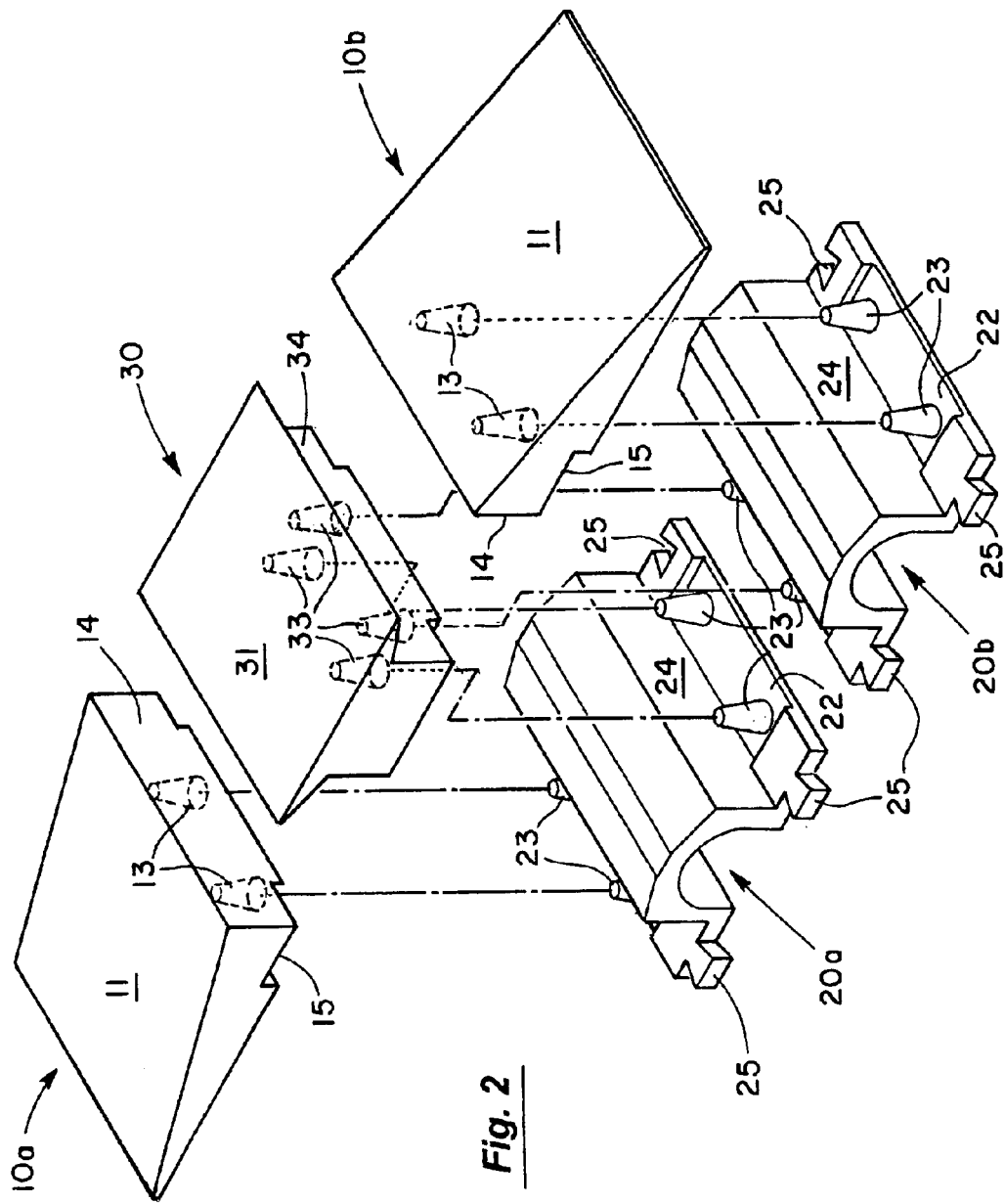
FIG. 2 is an exploded top perspective view of the modular cable protector assembly corresponding to FIG. 1.

Turning to FIG. 1, a top perspective view is provided showing one possible configuration of the modular cable protector assembly. FIG. 2 is an exploded top perspective view of the modular cable protector assembly corresponding to FIG. 1. As shown in these figures, the major components of this configuration of the present invention are two side ramps 10a and 10b, two tunnel members 20a and 20b, and a tunnel connector 30.

As shown in FIG. 2, each side ramp 10a, 10b is generally wedge-shaped with an inclined ramp surface 11, a lateral surface 14 and a bottom. A number of connectors 13 are placed in the bottom of each side ramp 10a, 10b adjacent to the lateral surface 14. In the embodiment shown in the drawings, these connectors 13 are truncated conical indentations. However, other connector shapes or other types of connectors could be readily substituted. For example, sets of protrusions could extend downward from the bottom of the side ramp. The bottom of each side ramp 10a, 10b can be flat or equipped with feet for greater traction. The ramp surface 11 can be made uneven or equipped with pads or anti-slip patterns to increase traction. A number of voids can be formed in the bottom of the side ramps to decrease weight and manufacturing costs. Hand grips could be formed in the side ramps to make transportation of the side ramps easier.

The embodiment of the side ramps 10a, 10b shown in the drawings features a recessed edge 15 running along the length of the bottom of the side ramp adjacent to its lateral surface 14. The connectors 13 are located on the upper surface of this recessed edge 15. As will be discussed in greater detail below, the base member 22 of a tunnel member 20a, 20b can then be inserted under the recessed edge 15 of a side ramp 10a or 10b.

Each tunnel member 20a, 20b includes at least one tunnel extending the length of the tunnel member to allow passage of cables 50, as illustrated for example in FIGS. 3–8. Base flanges 22 extend laterally outward from the sides of the tunnel member 20a, 20b and can be used to underlay a side ramp 10a, 10b when it is aligned in a side-by-side relationship with the tunnel member. Each tunnel member 20a, 20b is also equipped with two sets of laterally-opposed complementary connectors 23. In the embodiment shown in the drawings, these complementary connectors 23 are truncated conical projections that extend upward from the base flanges 22. However, other shapes and types of connectors could be readily substituted. Each set of complementary connectors 23 is designed to removably engage the connectors 13 on the underside of a side ramp 10a, 10b when it is aligned in a side-by-side relationship with the tunnel member 20a, 20b, as illustrated in FIG. 2. The tunnel members 20a, 20b can also be equipped with end connectors 25 to enable a plurality of tunnel members to be connected together in series (i.e., end to end), as shown for example in FIGS. 3 and 6.

Given the modular nature of the side ramps 10a, 10b and tunnel members 20a, 20b, these components by themselves can be combined in a wide variety of configurations to create a single tunnel of any desired length. Side ramps 10*a*, 10*b* can be attached as desired on either or both sides of the tunnel, or only at selected locations along the tunnel. However, the central component of the present invention is the tunnel connector 30, which enables multiple tunnel members 20*a*, 20*b* to be removably secured together in parallel to create multiple tunnels. For example, the configuration depicted in FIGS. 1 and 2 employs a single tunnel connector 30 to secure two tunnel members 20*a* and 20*b*. The configuration depicted in FIGS. 6–8 utilizes two tunnel connectors 30*a* and 30*b* to secure three strings of tunnel members 20*a*, 20*b*, and 20*c* forming three tunnels in parallel.

Figure 9:
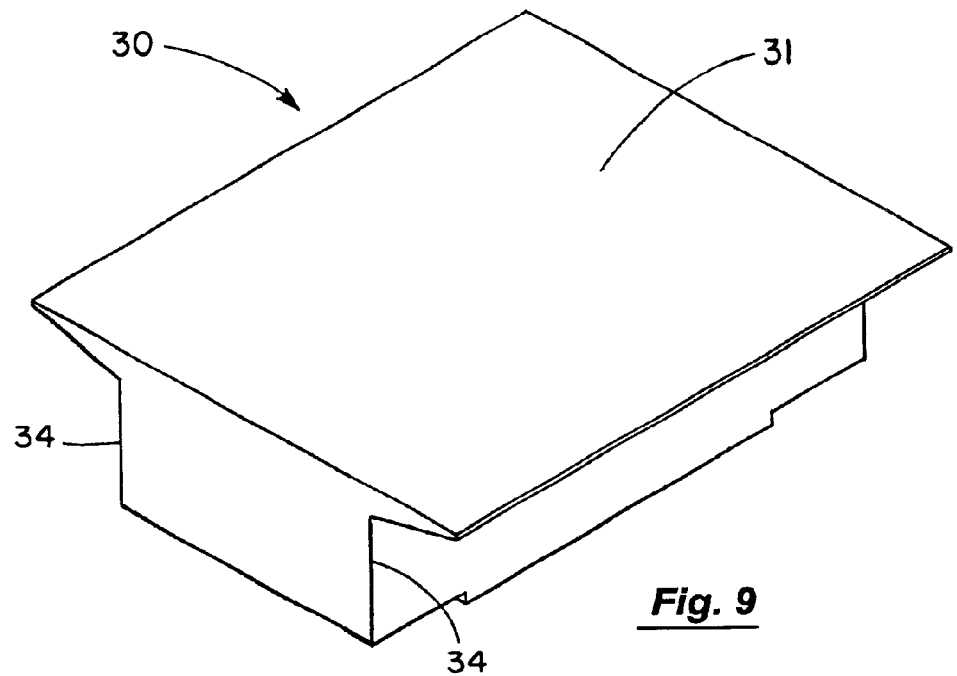
FIG. 9 is a top perspective view of tunnel connector 30.
Figure 10:
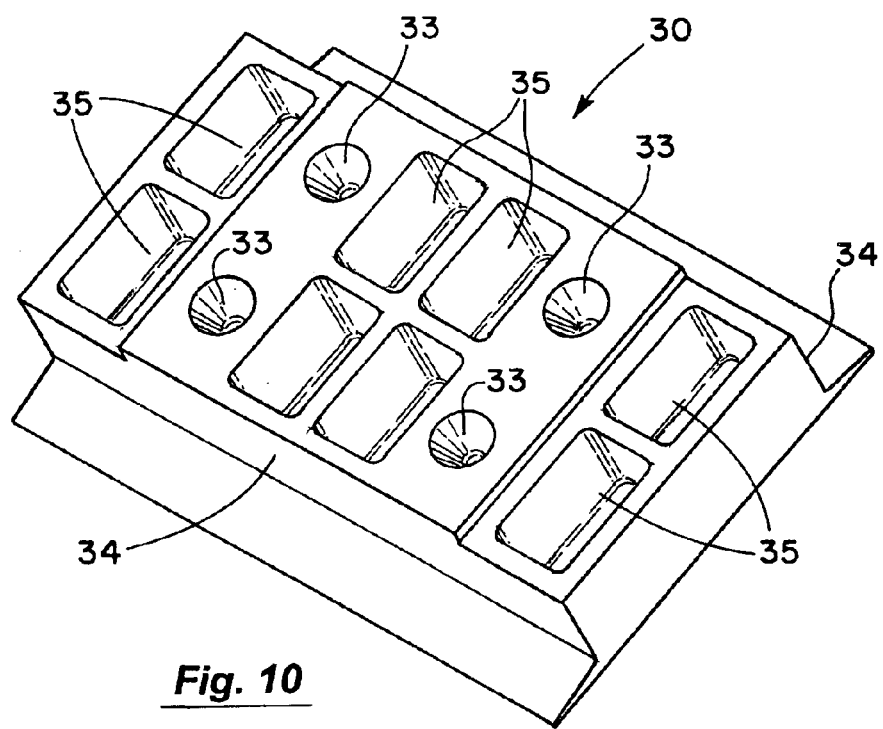
FIG. 10 is a bottom perspective view of the tunnel connector 30.
Figure 11:
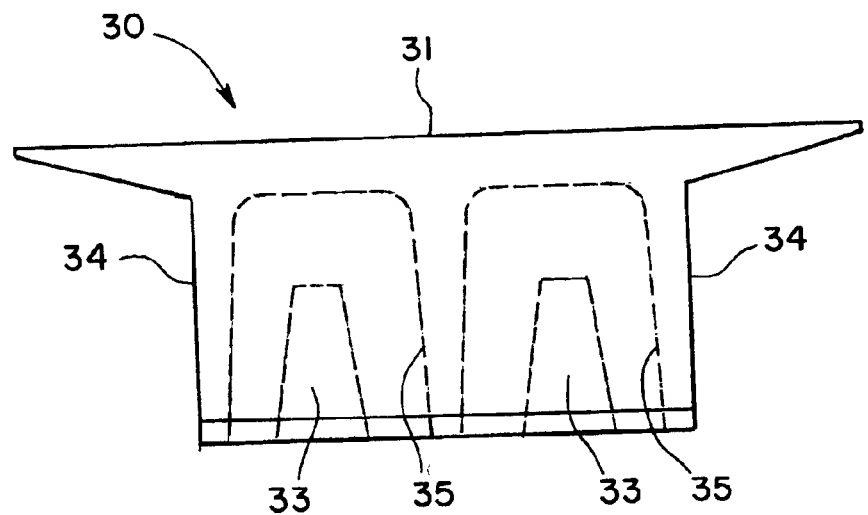
FIGS. 11 and 12 are two orthogonal cross-sectional views of the tunnel connector 30.
Figure 12:
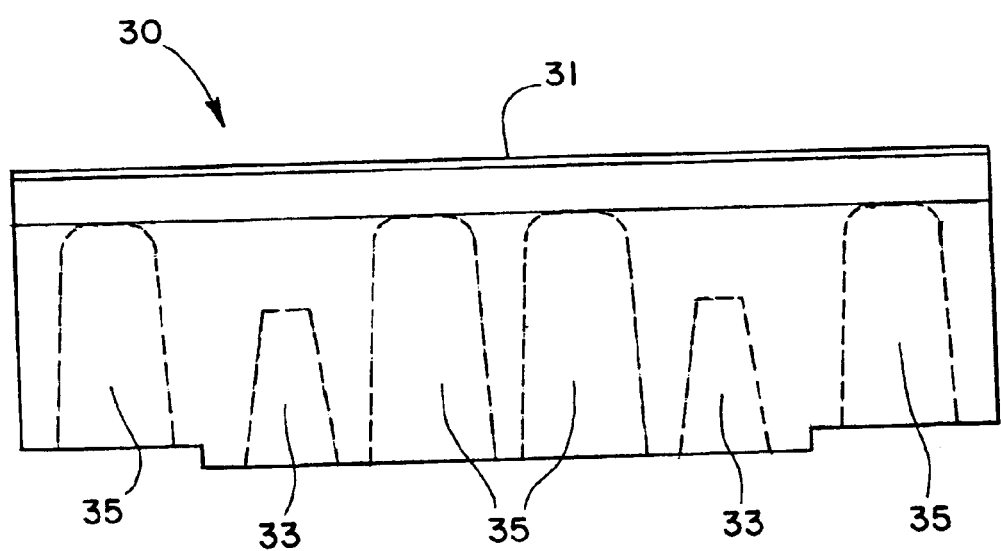

The tunnel connector 30 is shown in greater detail in FIGS. 9–12. FIGS. 9 and 10 are top and perspective views of the tunnel connector 30, respectively. FIGS. 11 and 12 provide two orthogonal cross-sectional views of the tunnel connector 30. The tunnel connector 30 is shaped to substantially fill the void between two tunnel members 20*a* and 20*b* when the tunnel members are aligned in a side-by-side relationship. In the preferred embodiment, the lateral surfaces 34 of the tunnel connector 30 are contoured to abut the corresponding lateral surfaces 24 of the tunnel members 20*a*, 20*b*, as shown in FIGS. 1 and 2. This provides added strength and rigidity to the assembly. Two sets of connectors 33 on the bottom of the tunnel connector 30 are designed to removably engage the complementary connectors 23 on two adjacent tunnel members 20*a*, 20*b* and thereby secure the tunnel members in a side-by-side relationship. In the embodiment shown in the accompanying drawings, the connectors 33, are truncated conical indentations. However, other connector shapes or other types of connectors could be readily substituted, provided they should be generally interchangeable with the connectors 13 on the side ramps 10*a*, 10*b* and must be able to engage the complementary connectors 23 on the tunnel members 20*a*, 20*b*.

When assembled in this manner, the top surface 31 of the tunnel connector 30 provides a substantially continuous surface extending between the tops of two adjacent tunnel members 20*a*, 20*b*. Thus, the top surfaces 11 of two side ramps 10*a*, 10*b* and the top surface 31 of the tunnel connector 30 combine to form a substantially continuous surface over the entire cable protector assembly in the configuration shown in FIGS. 1 and 2. The top surface 31 of the tunnel connector 30 can also be provided with an anti-slip pattern to increase traction. The tunnel connecter can be molded with a series of voids 35 to decrease weight and manufacturing costs.

Figure 3:
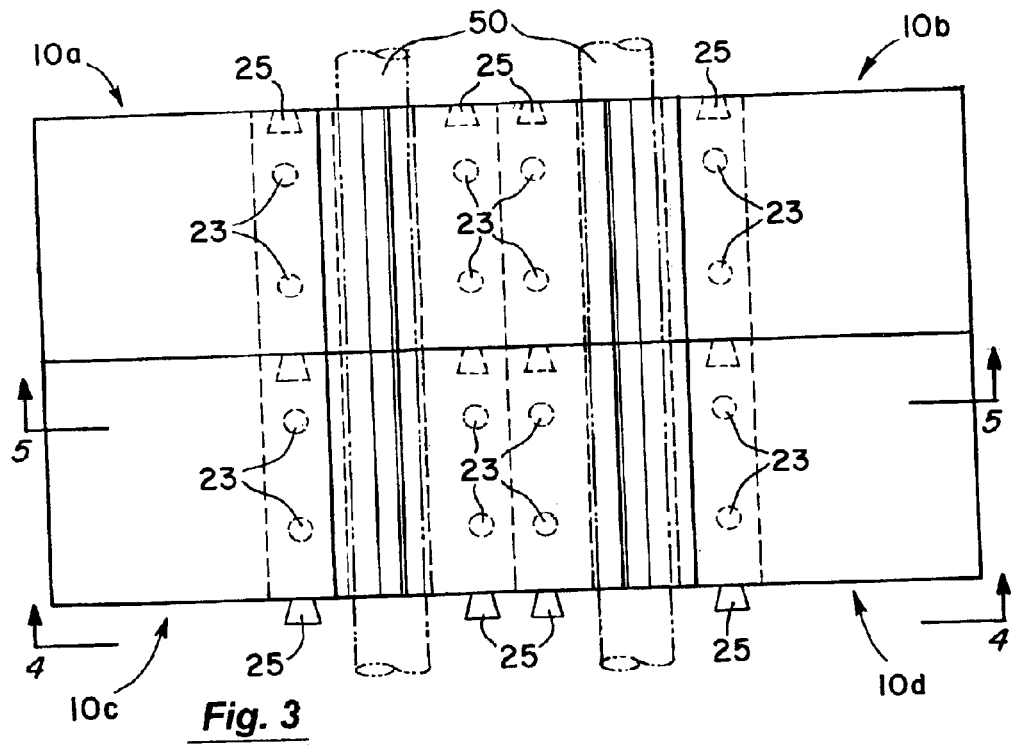
FIG. 3 is a top plan view of a configuration of the modular cable protector assembly using two sets of two tunnel members in series.
Figure 4:
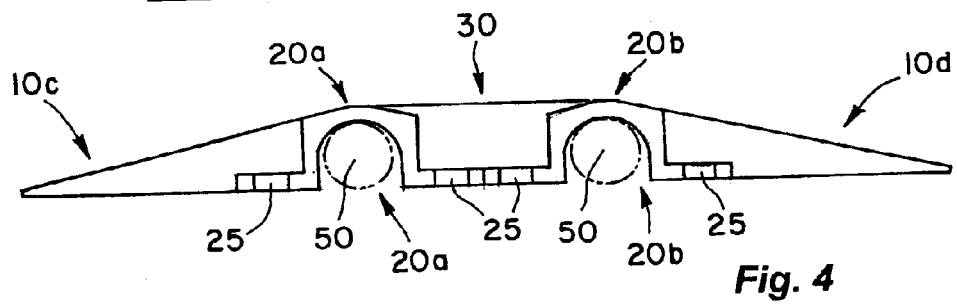
FIG. 4 is an end view of the modular cable protector assembly in FIG. 3.
Figure 5:
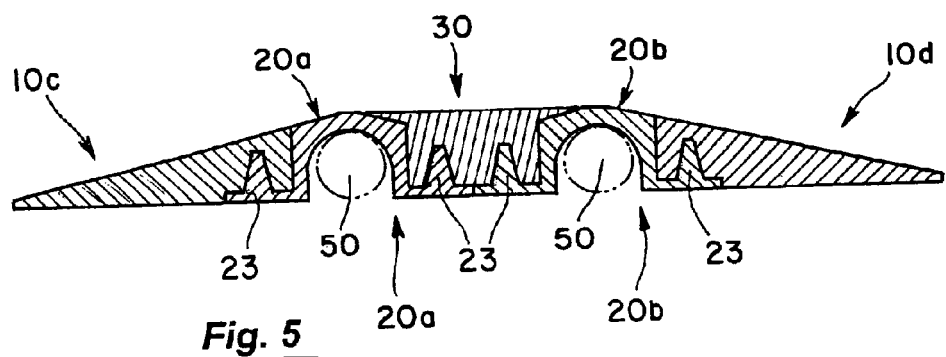
FIG. 5 is a cross-sectional view of the modular cable protector assembly in FIG. 3.

The modularity of the tunnel connectors 30, side ramps 10, and tunnel members 20 provides a much greater variety of configurations. In particular, tunnel members 20 can now be connected in parallel, as well as in series, to create any desired number of tunnels. For example, FIG. 3 is a top plan view of a configuration of the modular cable protector assembly using two sets of two tunnel members to create two tunnels in parallel. FIG. 4 is an end view of the modular cable protector assembly in FIG. 3. FIG. 5 is a corresponding cross-sectional view. Four side ramps 10*a*, 10*b*, 10*c* and 10*d* are attached to the tunnel members.

Figures 6, 7, 8:
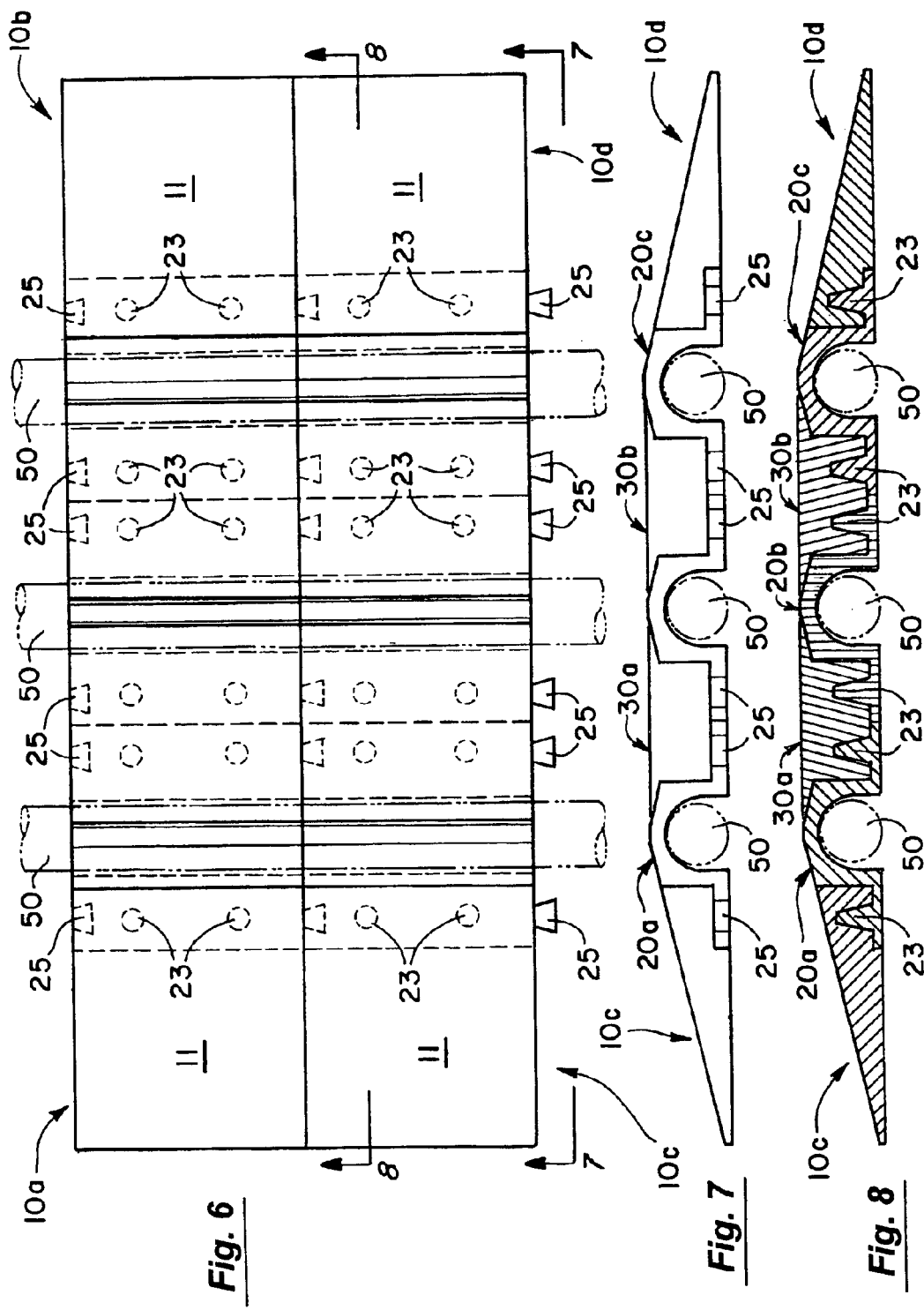
FIG. 6 is a top plan view of another configuration of the modular cable protector assembly using three sets of two tunnel members in series.
FIG. 7 is an end view of the modular cable protector assembly in FIG. 6.
FIG. 8 is a cross-sectional view of the modular cable protector assembly in FIG. 6.

FIG. 6 is a top plan view of another configuration of the modular cable protector assembly using three sets of tunnel members in parallel. FIG. 7 is an end view of the configuration shown in FIG. 6. FIG. 8 is a corresponding cross-sectional view. It should be readily understood that the modular nature of the components in the present invention could be extended to create any desired number of tunnels in parallel, and tunnels of any desired length. It should also be noted that the side ramps 10*a*-10*d* are also modular and can be readily attached or removed as desired.

The embodiments shown in the drawings assume that all of the components (i.e., side ramps 10, tunnel members 20 and tunnel connectors 30) have the same length. This approach provides maximum modularity, but is not necessarily the case. For example, a tunnel connector 30 could span the length of two or more tunnel members.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A modular cable protector assembly comprising:

at least one side ramp, each side ramp having a bottom with a set of connectors;

a plurality of tunnel members, each tunnel member having:

(a) two sets of laterally-opposed complementary connectors for removably engaging the connectors on a side ramp aligned in a side-by-side relationship with the tunnel member; and (b) at least one tunnel extending along the length of the tunnel member for passage of cables; and at least one tunnel connector having:

(a) two sets of connectors for removably engaging the complementary connectors on two tunnel members and thereby removably securing two tunnel members in a side-by-side relationship; and (b) a top surface extending between the tunnel members.

2. The modular cable protector assembly of claim 1 wherein the connectors on the tunnel connector and side ramps comprise indentations, and wherein the complementary connectors on the tunnel members comprise complementary protrusions.

3. The modular cable protector assembly of claim 1 wherein the connectors on the tunnel connector and side ramps comprise truncated conical indentations, and wherein the complementary connectors on the tunnel members comprise complementary truncated conical protrusions.

4. The modular cable protector assembly of claim 1 wherein the tunnel members further comprise lateral surfaces, and wherein the tunnel connector further comprises complementary lateral surfaces contoured to abut the lateral surfaces of the tunnel members.

5. The modular cable protector assembly of claim 1 wherein the tunnel members further comprise end connectors enabling a plurality of tunnel members to be connected together in series.

6. The modular cable protector assembly of claim 1 wherein the top surface of the tunnel connector and the top surfaces of the side ramps combine to form a substantially continuous surface over the cable protector assembly.

7. The modular cable protector assembly of claim 1 wherein the tunnel member further comprises base flanges extending laterally outward carrying the connectors.

8. A modular cable protector assembly comprising:

two side ramps, each side ramp having a set of connectors in the bottom of the side ramp;

a plurality of tunnel members, each tunnel member having:

(a) a tunnel extending along the length of the tunnel member for passage of cables;

(b) base flanges extending laterally outward from the tunnel for underlying the side ramps when aligned in a side-by-side relationship with the tunnel member; and (c) two sets of complementary connectors on the base flanges for removably engaging the connectors on the side ramps when aligned in a side-by-side relationship with the tunnel member; and at least one tunnel connector having:

(a) two sets of connectors on the bottom of the tunnel connector for removably engaging the complementary connectors on two tunnel members and thereby removably securing two tunnel members in a side-by-side relationship; and (b) a top surface extending between the tunnel members.

9. The modular cable protector assembly of claim 8 wherein the connectors on the tunnel connector and side ramps comprise indentations, and wherein the complementary connectors on the tunnel members comprise complementary protrusions.

10. The modular cable protector assembly of claim 8 wherein the connectors on the tunnel connector and side ramps comprise truncated conical indentations, and wherein the complementary connectors on the tunnel members comprise complementary truncated conical protrusions.

11. The modular cable protector assembly of claim 8 wherein the tunnel members further comprise lateral surfaces, and wherein the tunnel connector further comprises complementary lateral surfaces contoured to abut the lateral surfaces of the tunnel members.

12. The modular cable protector assembly of claim 8 wherein the tunnel members further comprise end connectors enabling a plurality of tunnel members to be connected together in series.

13. The modular cable protector assembly of claim 8 wherein the top surface of the tunnel connector and the top surfaces of the side ramps combine to form a substantially continuous surface over the cable protector assembly.

14. A modular cable protector assembly comprising:

at least one side ramp, each side ramp having a bottom with a set of connectors;

a plurality of tunnel members, each tunnel member having:

(a) two sets of laterally-opposed complementary connectors for removably engaging the connectors on two side ramp aligned in a side-by-side relationship with the tunnel member;

(b) at least one tunnel extending along the length of the tunnel member for passage of cables; and (c) lateral surfaces; and at least one tunnel connector having:

(a) a, bottom with two sets of connectors for removably engaging the complementary connectors on two tunnel members and thereby removably securing two tunnel members in a side-by-side relationship (b) opposing lateral surfaces contoured to abut the lateral surfaces of the tunnel members; and (c) a top surface extending between the tunnel members to provide a portion of a substantially continuous surface across the tunnel members in conjunction with the side ramps.

15. The modular cable protector assembly of claim 14 wherein the tunnel member further comprises base flanges extending laterally outward carrying the connectors.

16. The modular cable protector assembly of claim 14 wherein the tunnel members further comprise end connectors enabling a plurality of tunnel members to be connected together in series.

17. A modular cable protector assembly comprising:

two side ramps, each side ramp having a set of indentations in the bottom of the side ramp;

a plurality of tunnel members, each tunnel member having:

(a) a tunnel extending along the length of the tunnel member for passage of cables;

(b) base flanges extending laterally outward from the tunnel for underlying the: side ramps when aligned in a side-by-side relationship with the tunnel member; and (c) two sets of protrusions extending upward from the base flanges for removably engaging the indentations in the side ramps when aligned in a side-by-side relationship with the tunnel member; and at least one tunnel connector having:

(a) two sets of indentations in the bottom of the tunnel connector for removably engaging the protrusions on two tunnel members and thereby removably securing two tunnel members in a side-by-side relationship; and (b) a stop surface extending between the tunnel members.

18. The modular cable protector assembly of claim 17 wherein the indentations in the tunnel connector and side ramps have a truncated conical shape, and wherein the protrusions on the tunnel members comprise a complementary truncated conical shape.

19. The modular cable protector assembly of claim 17 wherein the top surface of the tunnel connector and the top surfaces of the side ramps combine to form a substantially continuous surface over the cable protector assembly.

20. The modular cable protector assembly of claim 17 wherein the tunnel members further comprise end connectors enabling a plurality of tunnel members to be connected together in series.

* * * * *